(12) United States Patent
Madhavarapu et al.

(10) Patent No.: US 9,424,140 B1
(45) Date of Patent: Aug. 23, 2016

(54) PROVIDING DATA VOLUME RECOVERY ACCESS IN A DISTRIBUTED DATA STORE TO MULTIPLE RECOVERY AGENTS

(71) Applicant: Amazon Technologies, Inc., Reno, NV (US)

(72) Inventors: Pradeep Jnana Madhavarapu, Mountain View, CA (US); Samuel James McKelvie, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 183 days.

(21) Appl. No.: 14/464,299

(22) Filed: Aug. 20, 2014

(51) Int. Cl.
*G06F 11/00* (2006.01)
*G06F 11/14* (2006.01)

(52) U.S. Cl.
CPC .................................. *G06F 11/1464* (2013.01)

(58) Field of Classification Search
CPC .................................................. G06F 11/1464
See application file for complete search history.

(56) References Cited

U.S. PATENT DOCUMENTS

| | | | |
|---|---|---|---|
| 6,044,444 A | 3/2000 | Ofek | |
| 7,165,079 B1 * | 1/2007 | Chen | ................. G06F 17/30067 |
| 8,140,485 B2 | 3/2012 | Dawson et al. | |
| 8,281,069 B2 | 10/2012 | van der Goot et al. | |
| 8,676,750 B2 | 3/2014 | Bitar et al. | |
| 8,683,262 B1 | 3/2014 | Subbiah et al. | |
| 2014/0281709 A1 * | 9/2014 | D'Amato | ............ G06F 11/1458 714/19 |

* cited by examiner

*Primary Examiner* — Joseph Kudirka
(74) *Attorney, Agent, or Firm* — Robert C. Kowert; Meyertons, Hood, Kivlin, Kowert & Goetzel, P.C.

(57) ABSTRACT

A distributed data store may provide volume recovery access to multiple recovery agents. A data volume may be maintained for a storage client at the distributed data store. Write access to the data volume may be granted according to a single writer consistency scheme. When a recovery event is detected for the data volume, the data volume may be made available to multiple recovery agents that may perform respective recovery operations. Upon first completion of a recovery operation for the data volume, granting access to the data volume according to the single writer consistency scheme may be resumed. In some embodiments, the distributed data store may be a log-structured data store.

20 Claims, 15 Drawing Sheets

PROVIDING DATA VOLUME RECOVERY ACCESS IN A DISTRIBUTED DATA STORE TO MULTIPLE RECOVERY AGENTS

BACKGROUND

Data storage systems have implemented many different storage schemes for efficiently and reliability persisting data. Storage schemes implemented on a distributed system architecture are often deployed when storage system client applications, such as database systems, require greater availability of the data persisted in the data storage system. Common solutions to making data available including storing one or more versions or replicas of data on multiple storage nodes. However, by increasing the number of versions or replicas, the complexity and operational costs for maintaining a consistent view of persisted data increases. Synchronization protocols are used to ensure consistency when changes are made to the versions or replicas of data across the storage node. However, typical synchronization protocols often increase the time and resources required to perform the change consistently. The costs to maintain a consistent view in the data storage system can dull the very advantages of implementing the distributed storage system.

For example, consistency schemes may complicate maintenance or support tasks for storage systems. Maintenance functions, such as recovering a data volume, may need access to the data volume in order to perform. However, consistency schemes may limit the ability of a maintenance function to perform if, for instance, another function or the storage client itself is accessing the data volume. Delaying or inhibiting performance of maintenance and support tasks may reduce overall data storage performance and reliability.

Figure 1:
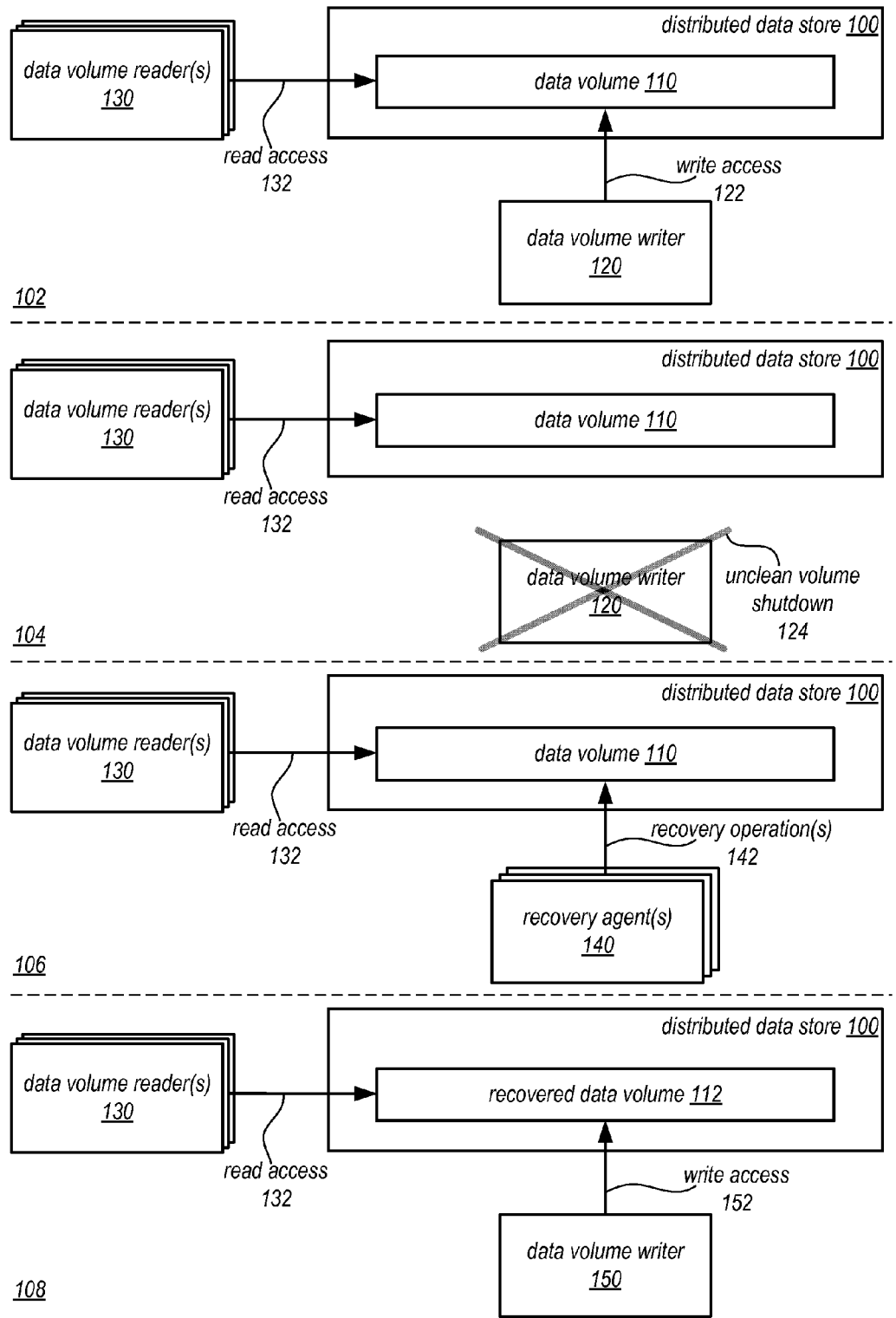
FIG. 1 is a series of block diagrams illustrating providing data volume recovery access in a distributed data store for multiple recovery agents, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of providing volume recovery access in a distributed data store for multiple recovery agents are described herein. A distributed data store may provide storage for various storage clients. These storage clients may include many different types of applications or services which rely upon the distributed data store to provide reliable and consistent access to stored data (which may be referred to herein as a "data volume"). For example, a database system, such as described below with regard to FIGS. 2-9 may utilize a distributed data store as the backend storage for a database. According to the needs of applications and services that rely upon the distributed data store, a distributed data store may be configured to provide varying levels of access to a data volume. For instance, some applications, such as the database system referred to above, may require a high reading and/or writing workload when accessing the data. In such a scenario multiple different components may provide read access to the data volume so that the database application may handle many different requests to read data from the storage volume. Thus, access for these reading components may need to be provided. Similarly, a high writing workload making changes to the database may need to be accounted for by providing a low latency consistency scheme to allow write access in a way that does not hamper the performance of the writing workload.

In order to accommodate the reading and/or writing workloads for storage clients, a distributed data store may implement a consistency scheme or mechanism. For example, a single writer consistency scheme may be implemented, in some embodiments, to provide a mutually exclusive right to a particular a storage client. This writing client may acquire some kind of lease or authorization from the distributed data store that allows the writing client to perform writes with respect to a particular data volume. A single writer consistency scheme may allow for greater writing workloads as the number of steps to synchronize writes to the distributed data store may be significantly less for one writer than if multiple storage clients were allowed write access.

However, in some embodiments, if a writing client fails, crashes, stops, writing, or otherwise becomes unavailable causing a data volume to be in an inconsistent or possibly inconsistent state, other support systems or maintenance operations may be unable to continue performing without performing some type of recovery operation on the data volume. For example, backup operations may be performed on a data volume storing changes to a data volume in a separate backup data store. If the storage client crashes, the backup operation may be unable to continue backing up data as it may not be able to identify what data is consistent and should backed-up and what data should not be backed-up. Thus, performing recovery for a data volume may be important in order for the backup operation to continue.

Generally, recovering a data volume may mean determining for a storage client that has failed and restarted (or a new storage client replacing an old/failed storage client) the committed state of data volume. A recovery operation may involve some kind of access to the data volume and may, in various embodiments, involve one or more writes to the data volume. For example, as part of a recovery operation different metadata or other information about a data volume may be written to different storage nodes in a distributed data store maintaining the data volume. In log-structured, distributed data stores, as described below with regard to FIGS. 2-9 for example, part of recovery may involve determining a recovery point in the log for a data volume. The recovery point may be the last committed log record acknowledged to storage client with no missing or incomplete log records, or a last durably persisted log record, indicating a consistent view of the data volume from which a storage client and/or the support or maintenance functions may continue to operate. This recovery point may be recorded at different storage nodes in the log-structured distributed data store in order to indicate to future storage clients, reading clients, or other components that access the data volume the consistent view of the data volume.

For distributed data stores implementing single writer consistency schemes for write access to a data volume, recovery scenarios may prove a challenge. If, for instance, recovery operations are limited to those systems that typically receive write access, such as a storage clients, then other systems, functions, or processes that depend on a recovered data volume before continuing functioning may have to wait until a new storage client can perform the recovery operation, which may be a long time if a storage client failure is part of a larger failure that is not quickly solvable or goes unnoticed. However, if another recovery agent, such as a recovery service agent implemented as part of a recovery service for data volumes maintained a distributed data store performs the recovery operation, then a storage client or other component may be blocked from write access to the data volume until recovery is completed (or evict the recovery service agent effectively starting the recovery operation over again and delaying recover of the data volume further). Providing volume recovery access to multiple recovery agents may be implemented in distributed data stores that utilize single writer consistency schemes, allowing recovery operations to begin sooner and be completed by different components without disrupting one another.

FIG. 1 is a series of block diagrams illustrating providing data volume recovery access in a distributed data store for multiple recovery agents, according to some embodiments. At scene 102 distributed data store 100 maintains data volume 110. Distributed data store 110 may be implemented in a variety of different ways including multiple different storage nodes, servers, systems or devices (e.g., such as computing system 2000 described below with regard to FIG. 15). Data volume 110 may be stored in different ways as well. For example, in some embodiments distributed data store 100 may be a log-structured data store. The log-structured data store may using a single log sequence number space to ensure consistent views of a data volume. Thus when updates or changes to the data volume stored at the log-structured data store are made, the updates or changes may be committed to a log for the data volume. Note however that other types of storage schemes may be implemented and thus, the previous example is not intended to be limiting.

In some embodiments, data volume reader(s) 130 may have read access 132 to data volume 110. Data volume reader(s) 130 may be components, such as servers or nodes associated with a storage client that access data volume 110 to return certain data. Data volume reader(s) 130 may also be various support or maintenance functions, such as a data backup component or system that interact with a consistent view of data volume 110. Also illustrated in scene 102 is data volume writer 120. Data volume writer 120 (which may also be referred to as a storage client) may have rite access 122 to data volume 110. Write access may be provided according to single writer consistency scheme in some embodiments. For example, data volume writer 120 may have to acquire a lease or other lock on data volume 110 in order to be provided with write access under the single writer consistency scheme. Data volume reader(s) 130 and data volume writer 120 may be one of various systems, applications, or devices configured to access data volume 110 (e.g., computing system 2000 described below in FIG. 15).

In scene 104, data volume writer 120 has failed, crashed or otherwise become unable to perform a clean volume shutdown 124 or closing operation for data volume 110. This unclean volume shutdown may leave data volume 110 in an inconsistent state. For example, some write requests may be submitted to and made durable at different storage nodes or locations within distributed data store 100, prior to being acknowledged back to data volume writer 120 as durable. In some embodiments, writes or changes to data may occur out of order, leaving some write requests that were durably maintained dependent upon some writes that were never performed or made durable (e.g., written to enough copies). This scenario may become even more acute in embodiments where distributed data store 100 is a log-structured data store. Some log records that are "later" in the log may be written to the log prior to "earlier" log records upon which the later log records depend. In these and other unclean shutdown scenarios, data volume 110 may be in an inconsistent state (or even if the data volume 110 is in a consistent state it may not be ascertainable by data volume reader(s) 130 that data volume 110 is in a consistent state). Thus, read access 132 may continue by data volume readers 130 for those portions of data volume 110 which may be ascertained as consistent, or alternatively no read access 132 may be allowed or possible (not illustrated).

The unclean volume shutdown 124 may be detected as a recovery event for data volume 110. More generally, a recovery event may be any event which may trigger the performance of a recovery operation. Thus, in addition to unclean volume shutdown 124, other recovery events may include detecting that a lease has expired for data volume writer 120, receiving a release request or command to evict the current writer (or recovery agent) from accessing data volume 110.

In response to detecting the recovery event, the data volume may be made available to multiple recovery agents 140 to access data volume 110 in order to perform recovery operation(s) 142. Each recovery agent 140 may perform its on recovery operation independently of any other recovery agent 140. In some embodiments, recovery agent(s) 140 may be a recovery service agent provisioned and/or directed to perform a recovery operation for data volume 110 as part of a recovery service for distributed data store 100. In some embodiments, recovery agent(s) 140 may be storage clients (e.g., new data volume writers). Please note that different recovery agent(s) 140 may perform a same technique as part of a recovery operation but achieve or determine different results. Thus a consistent view of data volume 110 generated by recovery operations may differ from recovery agent to recovery agent.

Figure 7:
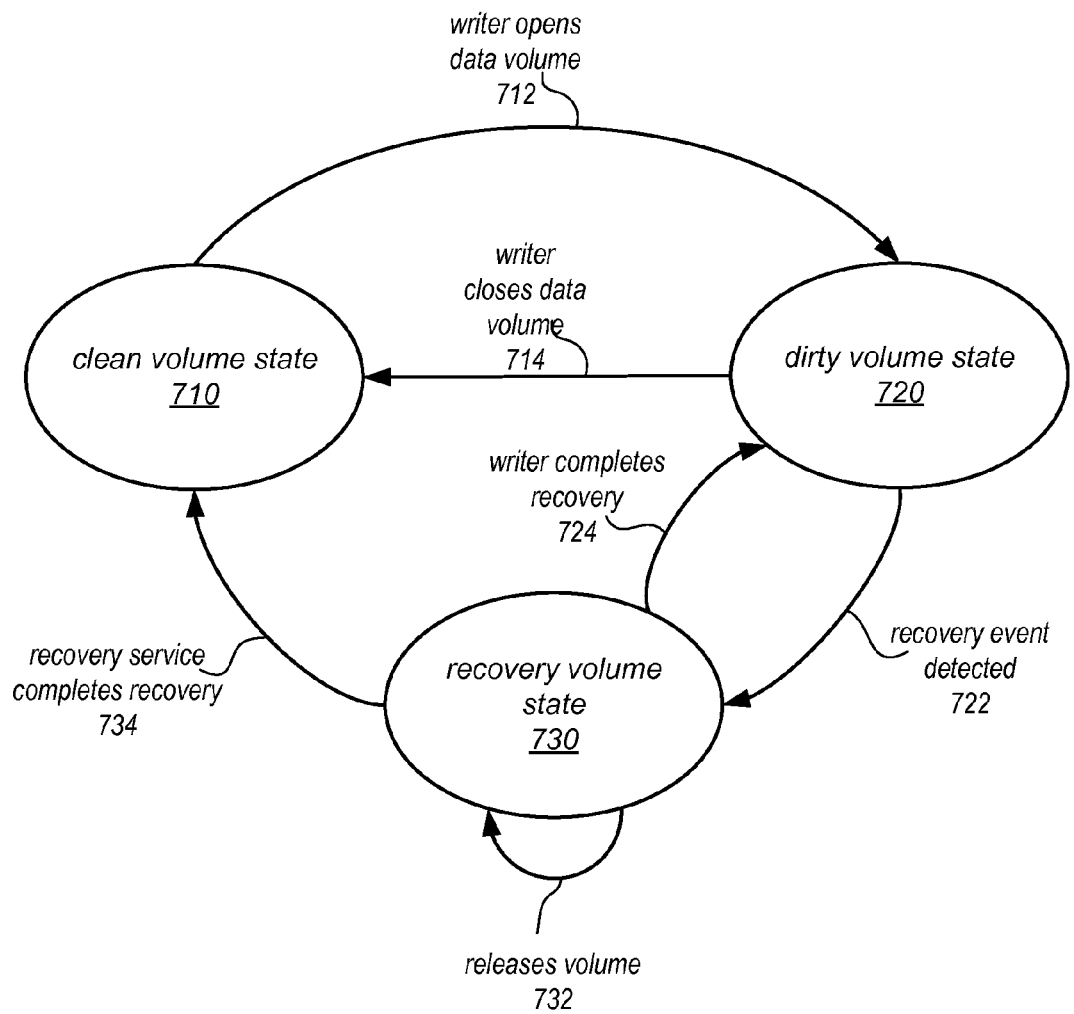
FIG. 7 is a state diagram illustrating different volume states for a data volume stored in a distributed data store in order to provide volume recovery access to multiple recovery agents, according to some embodiments.

In some embodiments, making the data volume available to multiple recovery agents may include transitioning a volume state of the data volume from a dirty volume state to a recovery volume state. While in a recovery state, recovery agent(s) 140 may be able to perform write operations that are part of a recovery operation. Thus if, for example, new metadata or markers identifying consistent views of data in data volume 110 are identified and written to various portions of data volume 110, then multiple recovery agent(s) 140 may be allowed to perform the write operations (as would not be permissible if the single writer consistency scheme were being enforced). FIG. 7, discussed in detail below, provides various examples of the transitions to a recovery state, and upon completion to a clean or dirty state (both of which states resume enforcing the single writer consistency scheme). Please note that although multiple recovery agent(s) 140 may be able to perform a recovery operation, it may be that only one recovery agent 140 actually performs the recovery operation, in some embodiments.

Upon a determination that the first recovery operation is complete, granting write access to data volume 110 may be resumed, according to the single writer consistency scheme, in some embodiments. As illustrated in scene 108, recovered data volume 112 may be available for read access 132 by data volume reader(s) 130, as well as write access 152 by a new data volume writer 150. In some embodiments, data volume reader(s) 130 may access 132 recovered data volume 112 whether or not a new data volume writer 150 access recovered data volume 110.

Please note, FIG. 1 is provided as a logical illustration of a distributed data store providing volume recovery access for multiple recovery agents, and is not intended to be limiting as to the physical arrangement, size, or number of components, modules, or devices, implementing a distributed data store, data volume reader or data volume writer.

The specification first describes an example of a distributed data store as a distributed storage service, according to various embodiments. The example distributed storage service may store data for many different types of clients, in various embodiments. One such client may be a network-based database service, described in further detail below. Included in the description of the example network-based database service are various aspects of the example network-based database service along with the various interactions between the database service and the distributed storage service. The specification then describes a flowchart of various embodiments of methods for providing volume recovery access in a distributed data store for multiple recovery agents. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. The volume metadata may indicate which protection groups, and their respective storage nodes, maintain which partitions of the volume. For example, in some embodiments, in response to a request to make a change to a database, the client-side driver may be configured to determine the protection group, and its one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
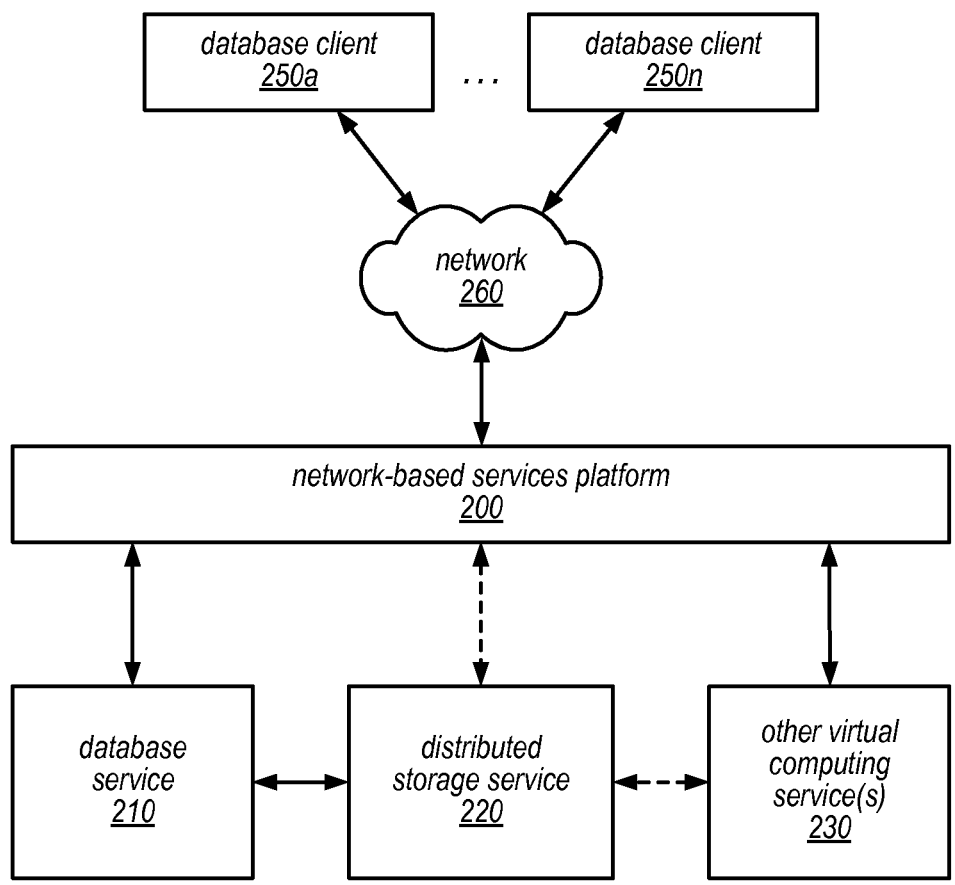
FIG. 2 is a block diagram illustrating a service system architecture that may be configured to implement a network-based database service and a network-based distributed storage service, according to some embodiments.

One embodiment of a service system architecture that may be configured to implement a network-based services-based database service is illustrated in FIG. 2. In the illustrated embodiment, a number of clients (shown as clients 250a-250n) may be configured to interact with a network-based services platform 200 via a network 260. Network-based services platform 200 may be configured to interface with one or more instances of a database service 210, a distributed storage service 220 and/or one or more other virtual computing services 230. Distributed storage service may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 15 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services).

In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250a through 250n, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
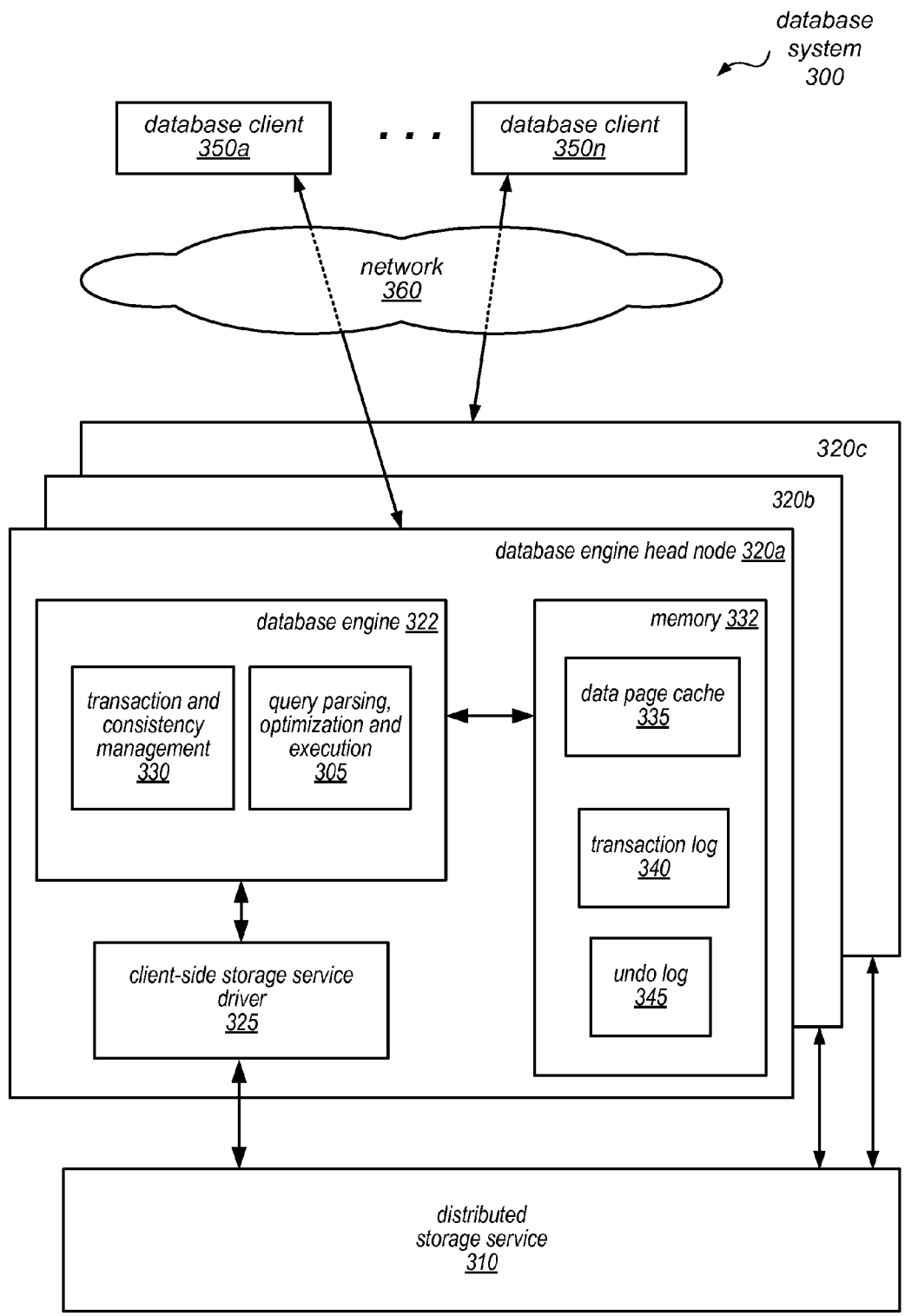
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed storage service 310, which may be employed by the database system to store a database volume (such as data pages of one or more databases, as well as redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a). Client-side storage device may maintain mapping information about the database volume stored in distributed storage service 310, such that a particular protection group maintaining a partition of the database volume may be determined. Read requests and redo log records may then be routed to storage nodes that are members of the protection group according to the partition of user data to which the read request is directed or to which the redo log record pertains.

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed storage systems described herein may organize data in various logical data volumes, extents (which may include partitions of the user data space in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the distributed storage service that together make an extent durable. Multiple segments, each of which lives on a particular one of the storage nodes in a protection group, are used to make the extent durable.

In some embodiments, each data page is stored in a segment, such that each segment stores a collection of one or more data pages and a change log (also referred to as a redo log) (e.g., a log of redo log records) for each data page that it stores. Thus, change logs may be log records segmented to the protection group of which the segment is a member. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)) assigned from a log sequence number space. Each ULR may be persisted to one or more synchronous segments in the log-structured distributed store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. Multiple segments may be implemented in a protection group to persist an extent. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Log records may include metadata, such as pointers or back links, that indicate a previous LSN for log record maintained at a particular segment and/or the previous LSN in the log sequence number space. Control Log Records (CLRs), which are generated by the storage system, may also contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance. Multiple storage nodes may together implement a protection group, in some embodiments.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
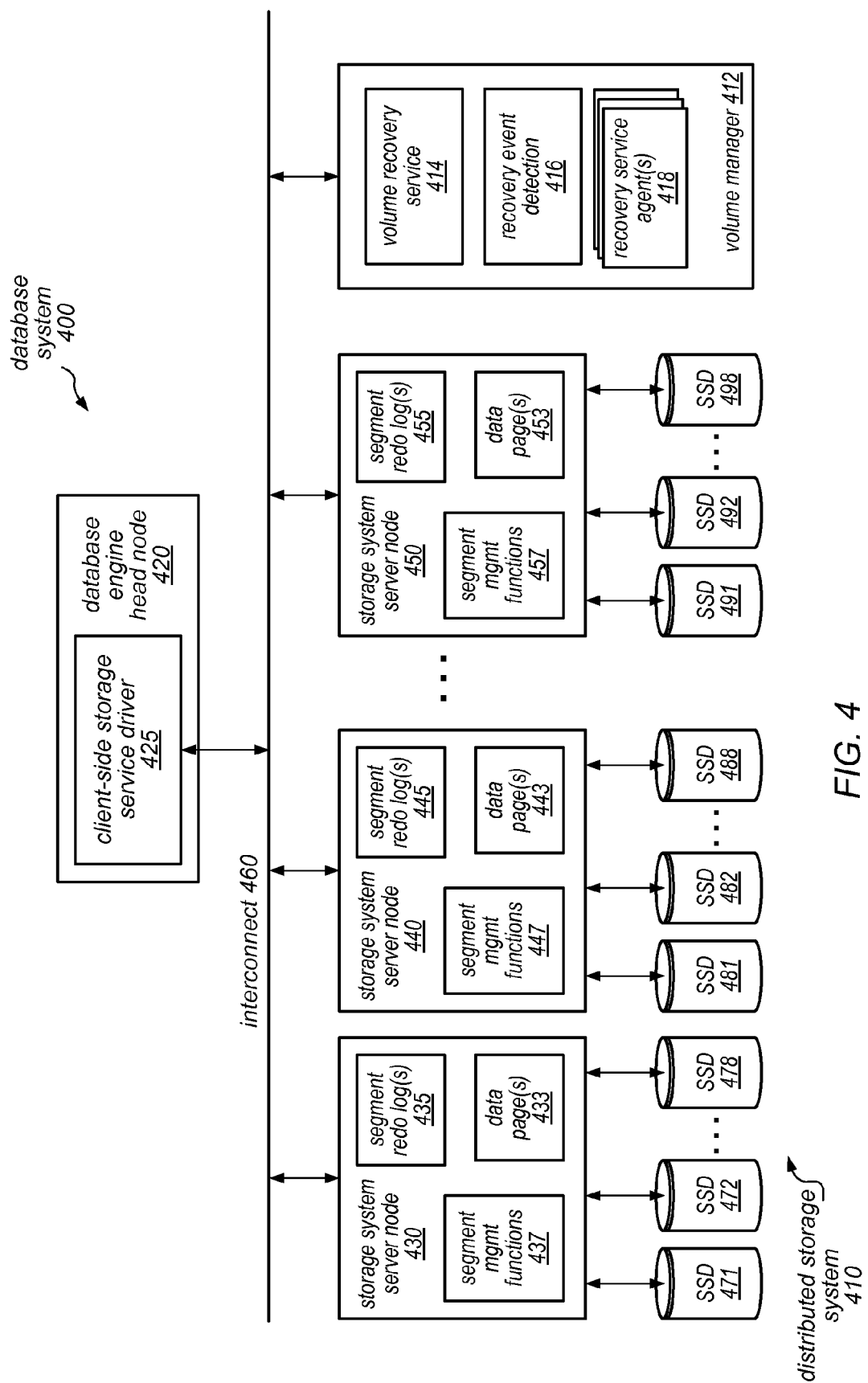
FIG. 4 is a block diagram illustrating a distributed storage system, according to some embodiments.

One embodiment of a distributed storage system is illustrated by the block diagram in FIG. 4. In at least some embodiments, storage nodes 430-450 may store data for different clients as part of a multi-tenant storage service. For example, the various segments discussed above and below with regard to FIG. 9, may correspond to different protection groups and volumes for different clients.

In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Distributed storage system 410 may also implement a storage control plane. Storage control plane may be one or more compute nodes configured to perform a variety of different storage system management functions. For example, storage control plane may implement a volume manager 412, which may be configured to maintain mapping information or other metadata for a volume, such as current volume state, current writer, truncation tables or other truncation information, or any other information for a volume as it is persisted in varying different, extents, segments, and protection groups. Volume manager 412 may be configured to communicate with a client of storage system 410, such as client-side driver 425 in order to "mount" or "open" the volume for the client, providing client-side driver 425 with mapping information, protection group policies, and various other information necessary to send write and read requests to storage nodes 430-450. Volume manager 412 may be configured to provide the maintained information to storage clients, such as database engine head node 420 or client-side driver 425 or to other system components such as recovery service agents 418. For example, volume manager 412 may provide a current volume state (e.g., clean, dirty or recovery), current epoch indicator and/or any other information about the data volume.

Volume manager 412 may, in various embodiments, be configured to provide volume recovery access to multiple recovery agents, such as client-side driver 425 and/or database engine head node 420, or recovery service agent(s) 418. As noted above, volume manager 412 may be configured to maintain and/or manage a current volume state for a data volume. Volume state may be clean, dirty, or recovery, as discussed below with regard to FIG. 7. When a data volume is in clean or dirty states, volume manager 414 may be configured to enforce a single writer consistency scheme so that only one client has write access to the data volume at a time. Thus, the writer may have mutually exclusive access. In FIG. 4 for example, database engine head node 420 via client-side storage service driver 425 may be the single writer. If however, the volume state is currently set to recovery, then multiple recovery agents may be able to access the data volume.

In some embodiments, volume manager 412 may implement a volume recovery service 414. Volume recovery service 414 may be configured to monitor or evaluate the current volume state and based, at least in part, on the evaluation, direct recovery service agent(s) 418 to perform a recovery operation with respect to a data volume. For example, volume recovery service may determine that the state of a particular data volume has remained in recovery state in excess of a time threshold and, in response direct one or more recovery service agent(s) 418 to perform a recovery operation for the data volume.

In some embodiments, volume manager 412 may implement recovery event detection module 416. Recovery event detection module 416 may detect recovery events for a data volume. For example, recovery event detection module 416 may receive an indication from client-side storage service driver 425 or database engine head node 420 that the data volume may not be re-opened or used again by a writing client. Additionally, recovery event detection module may determine other recovery events that may include detecting that a lease has expired for data volume client-side storage service driver 425 or database engine head node 420, or may receive a release request or command to evict the database engine head node 420 from another component of the database service 400. More generally, recovery event detection module 416 may detect any event which may trigger or require the performance of a recovery operation.

Volume manager 412 may also implement recovery service agent(s) 418 which may be individual or collections of computing systems, nodes or devices that are configured to perform recovery operations (such as described below with regard to FIGS. 6 and 13). Recovery service agent(s) 418 may be provisioned (from other computing resources of distributed storage system 410 or another system of network-based service platform 200 in FIG. 2) or directed to perform a recovery operation by volume recovery service 414. Recovery service agent(s) 418 may abort the performance of a recovery operation, if it is determined that a recovery operation for the same data volume is already complete.

Figure 5:
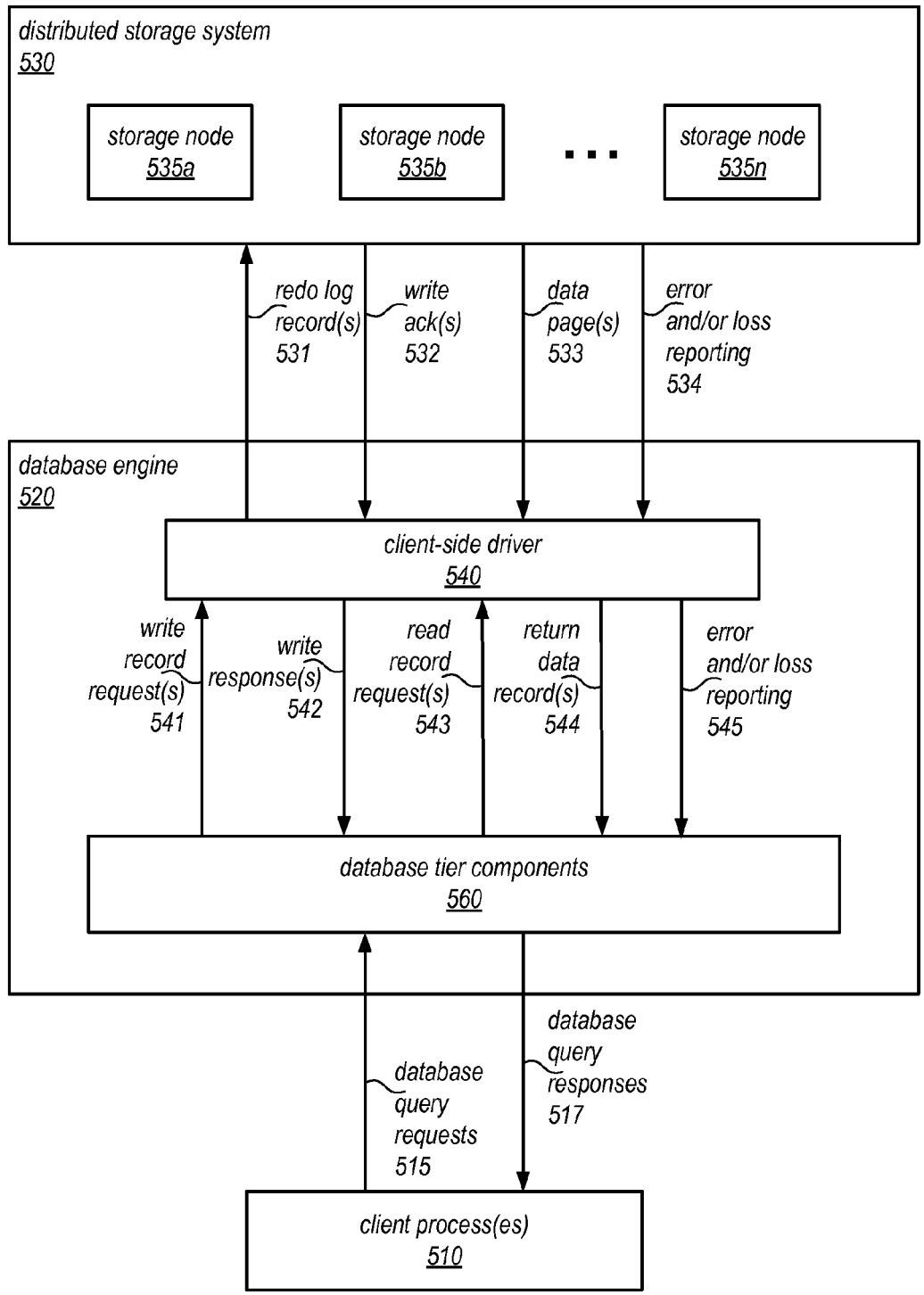
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3). In various embodiments, database engine 520 may have obtained a volume epoch indicator or other identifier from distributed storage system 530 granting access writes to a particular data volume, such as by sending a request to open the data volume to distributed storage system 530.

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of specific protection groups storing the partition user data of user data space to which the write record request pertains in distributed storage system 530. Client-side driver 540 may generate metadata for each of the redo log records that includes an indication of a previous log sequence number of a log record maintained at the specific protection group. Distributed storage system 530 may return a corresponding write acknowledgement(s) 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

As noted above, in some embodiments, the functional components of a database system may be partitioned between those that are performed by the database engine and those that are performed in a separate, distributed storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Figure 6:
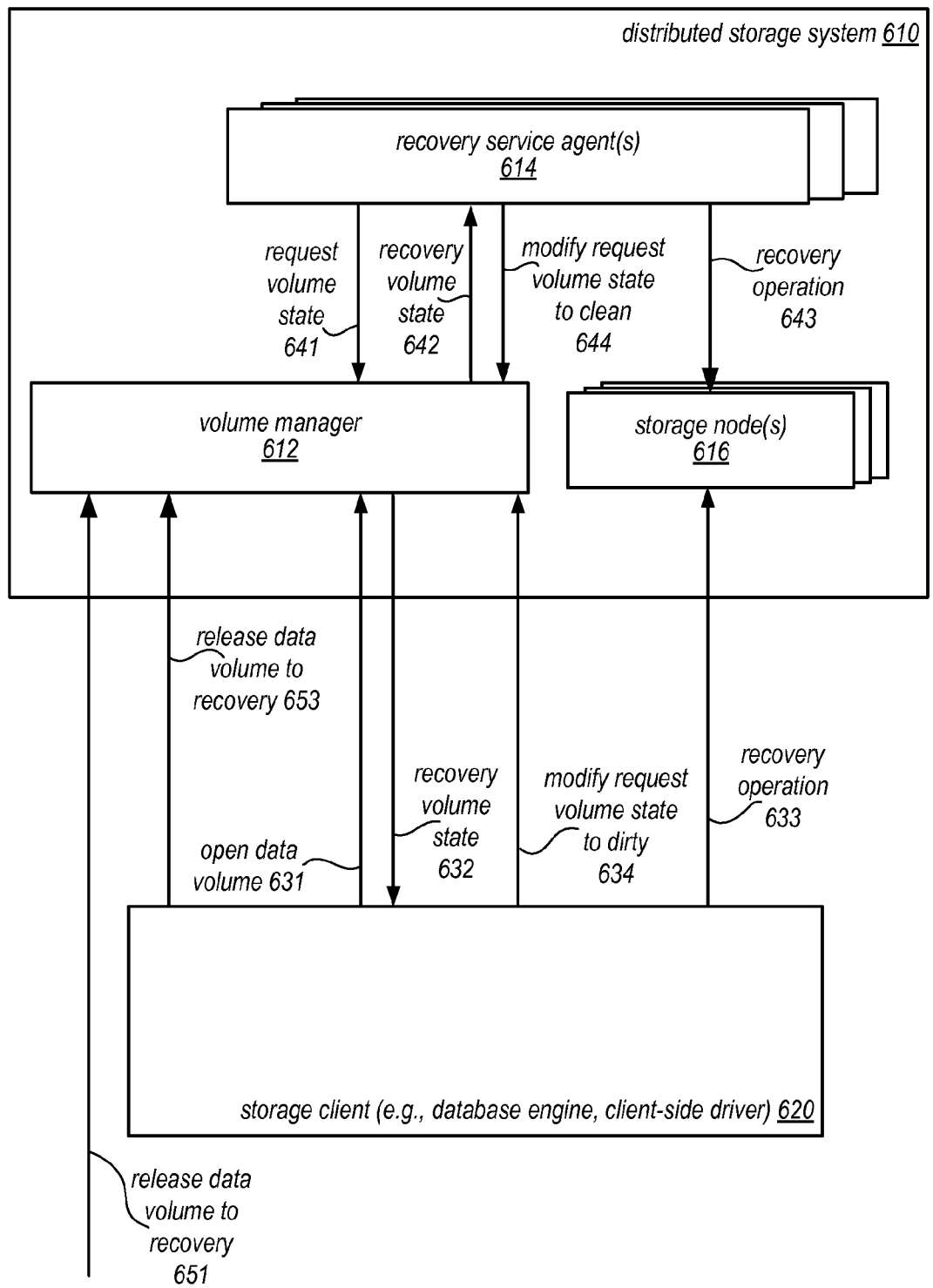
FIG. 6 is a block diagram illustrating interactions between a storage client and a distributed data store that provides volume recovery access to multiple recovery agents, according to some embodiments.

FIG. 6 is a block diagram illustrating interactions between a storage client and a distributed data store that provides volume recovery access to multiple recovery agents, according to some embodiments. Storage client 620 (which may be database engine head node 420 or client-side service driver 425 or any other storage client component) may send various requests to open a data volume for writing to the data volume and perform recovery operations, in various embodiments. For example, storage client 620 may send to volume manager 612 a request to open a particular data volume. Volume manager 612 may send a response indicating that the volume maintained among storage nodes 616 is in a recovery state 632. Storage client may interact with storage nodes 616 to perform a recovery operation 633, such as described below with regard to FIGS. 10 and 14, to determine a consistent view of the data volume. Upon completion of the recovery operation, storage client 620 may submit a request to modify the volume state to dirty in order to obtain exclusive write access. In some embodiments, storage client 620 may send a request to release a data volume 631 (triggering a recovery event for the data volume). Additionally, other systems or components may send a request to release the data volume 651 (which may be external to the storage client 620, such as a distributed storage system admin).

Recovery service agents(s) 614 may also interact with volume manager 612 and storage nodes 616 to perform a recovery of a data volume. A request for volume state 641 may be sent, and in response a recovery volume state 642 may be returned (including a current volume epoch indicator). Recovery service agents may perform recovery operations 643, such as described below with respect to FIGS. 10 and 13. Upon completion of a recovery operation each recovery service agent may send a request to modify the volume state to clean 644. In some embodiments, if a particular recovery service agent 614 fails while performing a recovery operation, a new recovery service agent may be provisioned to continuing performing the recovery operation without having to begin the recovery operation from the beginning.

Note that in various embodiments, the API calls and responses between database engine 520 and distributed storage system 530 (e.g., APIs 531-534) and/or the API calls and responses between client-side driver 540 and database tier components 560 (e.g., APIs 541-545) in FIG. 5 and/or distributed storage system 610, volume manager 612, storage nodes 616 and storage client 620 (e.g., 631, 632, 633, 634, 641, 642, 643, 644, 651, and 653) in FIG. 6 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with system components.

FIG. 7 is a state diagram illustrating different volume states for a data volume stored in a distributed data store in order to provide volume recovery access to multiple recovery agents, according to some embodiments. A current volume state may be maintained for a data volume stored in a distributed data store. As illustrated in FIG. 7, a clean volume state 710, a dirty volume state 720 and a recovery volume state 730 may be maintained. A current volume epoch indicator may be maintained in addition to the data volume state, which may be increased every time a state changes. Thus, state changes may be detected and enforced by storage nodes, volume manager, and/or any other components of the distributed storage service. Additionally, storage clients and any other recovery agents may use volume epoch indicators to perform various read and write operations when performing a recovery operation.

A clean volume state 720 may indicate that there is no writer session (e.g., storage client potentially writing) to the data volume. The correct and final VDL (and possibly the PGDL for each PG) may be recorded at the volume manager 412. There may be no LSNs floating around higher than VDL on any segment in the volume. These conditions are guaranteed to remain constant until the current volume epoch indicator is incremented at the volume manager. Readers can safely read up to VDL even if the current volume epoch indicator is subsequently incremented. A transition from clean volume state to dirty volume state 720 may occur when a writer opens a clean volume 712. For example, a storage client, such as client-side service driver 425 may request from volume manager 412 to open the volume, providing self-identification as well as a known volume epoch indicator of the clean state. The volume manager 412 may verify that the known clean volume epoch indicator is still correct, then atomically increments the volume epoch indicator, and marks the volume as dirty and with a current session belonging to the requesting client. The volume manager 412 may return the new volume epoch indicator and the VDL (and possibly the list of PGDLs) at the time of the atomic transition to the new client, which then "owns" a lease for writing. No other writer or recovery agent can steal the client's lease without transition to recovery volume state 730, in some embodiments. No recovery operation may be necessary when opening a clean data volume, in some embodiments.

A dirty volume state 720 may indicate that there is a writer session (e.g., a storage client) writing to the data volume, and it is possible that there may be log records committed or in flight beyond the VDL recorded at the volume manager 412. The writer may update UVDL at a write quorum in at least one PG, though such UVDL updates may lag behind acknowledging commits to distributed storage service applications. Readers may safely read up to the highest UVDL even after transition out of this state, in some embodiments. The data volume may remain in this state until the current volume epoch indicator is incremented at the volume manager 412. A storage client that owns the current lease epoch for a volume may transition the volume to a clean volume state 710 by performing a "clean shutdown," closing the data volume 714. Performing a clean shutdown may include ensuring that a last allocated LSN is a complete LSN (i.e., not in the middle of a transaction), that all allocated LSNs are volume complete so that the VDL is equal to the last allocated LSN. The writer may then ask the volume manager 412 to transition the data volume to clean volume state 710, providing the volume epoch indicator, and the final VDL (and possibly the PGDL list). The Volume manager 412 verifies correctness of the owned lease epoch, then atomically increments the lease epoch, clears the current writer session, and updates the current VDL (and possibly the PGDL list.) Volume manager 412 may then transition from dirty volume state 720 to clean volume state 710 in idempotent fashion. If, upon receiving the request, the Volume manager finds that the lease epoch has already been incremented, it can simply return a successful response.

A recovery volume state 730 may indicate that there may or may not be a current writing session associated with the volume, but if there is, the associated writer is not writing, and it may or may not be attempting to complete recovery. There may be LSNs in flight beyond the true VDL, and there may be LSNs beyond true VDL that are being peer-replicated. Recovery may need to be completed, after which the volume can transition to the clean state 710 (disconnecting any attached writer session) or dirty state 720 (retaining the current attached writer session). Multiple recovery agents may complete a recovery operation. As noted above, the first recovery agent to successfully transition state to clean 710 or dirty 720 will win, and other recovery agents may abandon their attempts without committing. In addition to completing the recovery operation, transition out of the recovery state may include updating a read quorum of segments in every PG in the volume to at least current volume epoch indicator for the recovery state 730 (blocking further changes from an evicted writer), and incrementing the volume epoch indicator at volume manager 412. In some embodiments, readers can safely read up to the highest known UVDL.

In some embodiments, recovery events may be detected 722 or triggered in multiple ways. For example, a new writer opens a dirty volume 720 after a previous writer dies, is terminated, or is abandoned. A new writer may cause the transition from dirty 720 to recovery 730 by asking the volume manager 412 to open the data volume, providing self-identification as well as known volume epoch indicator for the dirty state 720. Volume manager 412 may verify that the known volume epoch indicator is still correct, then atomically increments the volume epoch indicator, changes the writer session to the acquiring client, and marks the volume as recovery volume state 730. The new volume epoch indicator and the "recovery" state may be returned to the new writer. The new writer may then perform a recovery operation. In another example of transitioning to recovery 730, a release command may be received for a dirty volume 720 to evict an active writer (e.g., head node 420). For a release request, volume manager 412 may disconnect an active writer, if any. If the current volume state is dirty 720, volume manager 412 may atomically increments the volume epoch indicator, clear the writer session, and transition the volume state to recovery 730. A current volume epoch indicator may be included so as not to evict a writer that legitimately acquired the writing session.

As indicated at 732, a volume release request may also be received while remaining in the recovery state 730. Such a release may occur when a recovering volume is released in conjunction with eviction of an active writer. When a release request is received, volume manager 412 may remove the current writer session from the volume and increment the current volume epoch indicator, but leave the volume in recovering state 730. Note, if there is no current writer session attached to a volume that is in the recovery state 730 when a release request is received then there may be no need to increment the current volume epoch indicator.

A writer may first complete a recovery operation 724 transitioning to dirty volume state 720 from recovery volume state 730, in various embodiments. The writer may ensure that a super quorum (larger of a read or write quorum) of segments in each PG in the volume has a lease epoch equal to the current volume epoch indicator of the recovery state 730. The writer may also establishing a new VDL, truncation metadata, and PGDL list. The writer may send a request to transition to volume manager 412 and include a current volume epoch indicator. The volume manager 412 verifies that the current volume epoch indicator is still correct and that the current writer session is either clear or matches the existing client, then atomically increments the volume epoch indicator, mark the volume as dirty 730 and set the current writer session to the requesting client. The writer then "owns" the lease for writing. If the transition fails because the current volume epoch indicator has already been incremented, then the storage client may retry opening the volume at a new current epoch indicator as a recovery service may have performed recovery and marked the volume clean 710.

As indicated at 734, a recovery service agent may complete recovery, transitioning a data volume from recovery volume state 730 to clean volume state 710. A recovery service agent ma ensure that a super quorum (larger of a read or write quorum) of segments in each PG in the volume has a current volume epoch indicator equal to the current volume epoch indicator of the recovery state 730. If at any point during the recovery process, the recovery service agent detects that the current volume epoch indicator has been incremented, the recovery operation may be aborted. If the recovery service agent succeeds in establishing a new VDL, truncation metadata, and PGDL list, it may send a request to the volume manager 412 with the current volume epoch indicator for the recovery state, the new VDL, PGDL list and the truncation metadata. The volume manager 412 may verify that the current volume epoch indicator is still correct, then atomically increments the current volume epoch indicator, clear the current writer session, and mark the volume as clean 710.

A variety of different allocation models may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 8 and described below.

Figure 8:
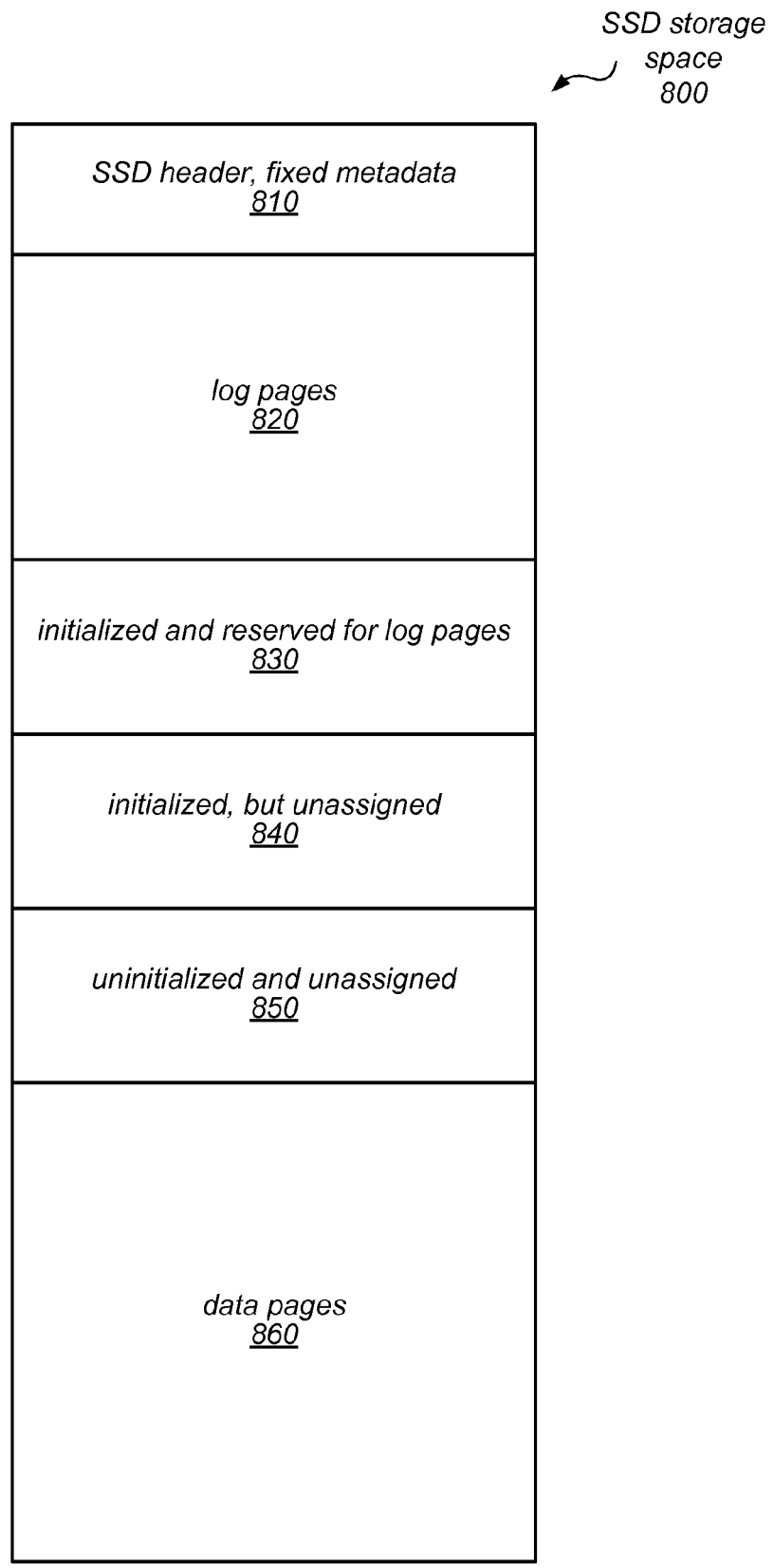
FIG. 8 is a block diagram illustrating how data and metadata may be stored on a storage node of a distributed storage system, according to some embodiments.

FIG. 8 is a block diagram illustrating how data and metadata may be stored on a given storage node (or persistent storage device) of a distributed storage system, according to one embodiment. In this example, SSD storage space 800 stores an SSD header and other fixed metadata in the portion of the space labeled 810. It stores log pages in the portion of the space labeled 820, and includes a space labeled 830 that is initialized and reserved for additional log pages. One portion of SSD storage space 800 (shown as 840) is initialized, but unassigned, and another portion of the space (shown as 850) is uninitialized and unassigned. Finally, the portion of SSD storage space 800 labeled 860 stores data pages.

In allocation approach illustrated in FIG. 8, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In some embodiments, a segment may consist of three main parts (or zones): one that contains a hot log, one that contains a cold log, and one that contains user page data. Zones are not necessarily contiguous regions of an SSD. Rather, they can be interspersed at the granularity of the storage page. In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, and/or access control metadata.

In some embodiments, the hot log zone may accept new writes from the client as they are received by the storage node. Both Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful.

In some embodiments, the distributed storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the distributed storage systems described herein, an LSN index may be stored in memory. An LSN index may map LSNs to log pages within the cold log zone. Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the distributed storage systems described herein, a log page table may be stored in memory, and the log page table may be used during garbage collection of the cold log zone. For example, the log page table may identify which log records are obsolete (e.g., which log records can be garbage collected) and how much free space is available on each log page.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a data volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments (i.e. group members) for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

Figure 9:
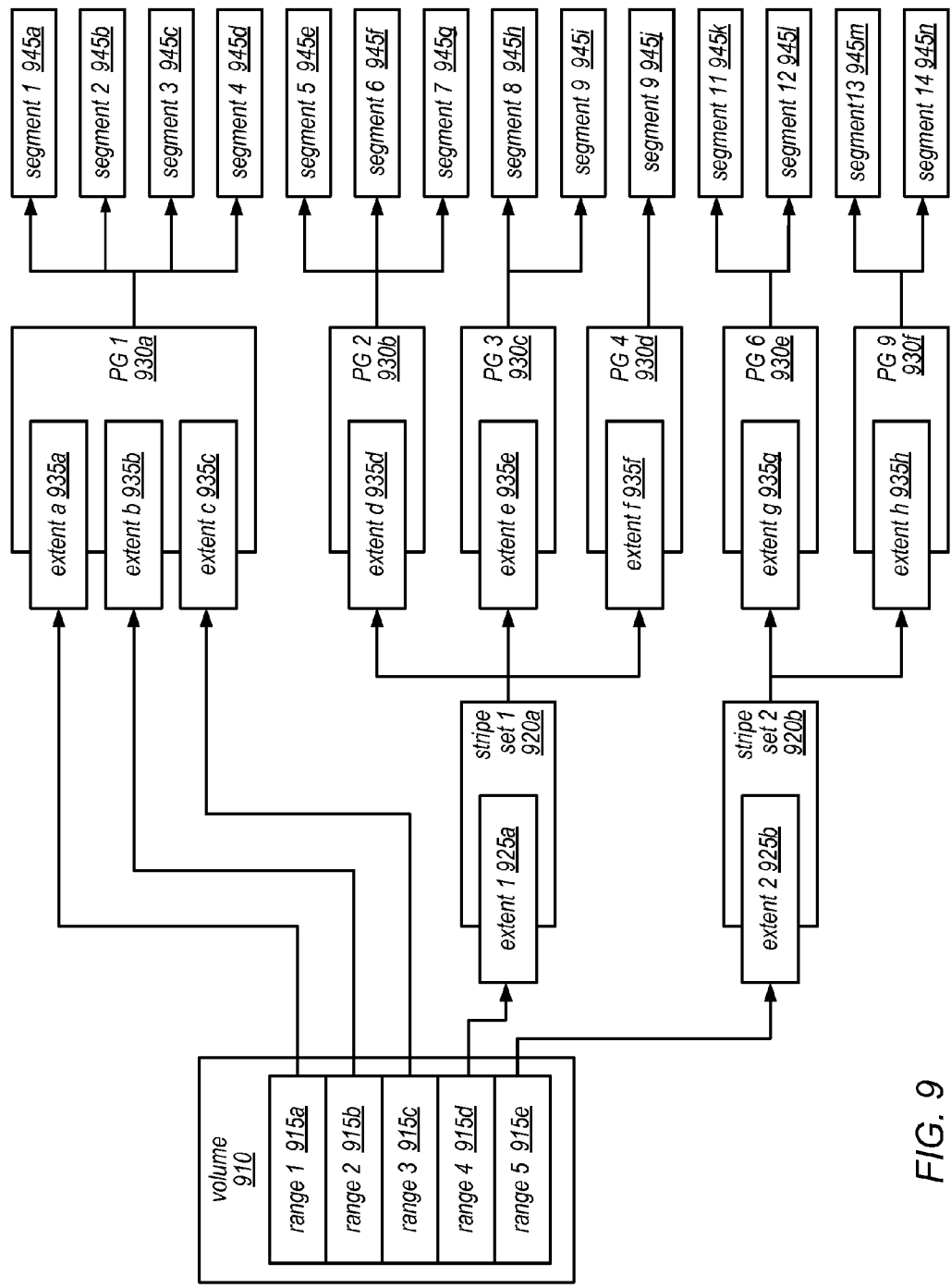
FIG. 9 is a block diagram illustrating an example configuration of a data volume, according to some embodiments.

FIG. 9 is a block diagram illustrating an example configuration of a database volume 910, according to one embodiment. In this example, data corresponding to each of various address ranges 915 (shown as address ranges 915a-915e) is stored as different segments 945 (shown as segments 945a-945n). More specifically, data corresponding to each of various address ranges 915 may be organized into different extents (shown as extents 925a-925b, and extents 935a-935h), and various ones of these extents may be included in different protection groups 930 (shown as 930a-930f), with or without striping (such as that shown as stripe set 920a and stripe set 920b). In this example, protection group 1 illustrates the use of erasure coding. In this example, protection groups 2 and 3 and protection groups 6 and 9 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (920a) and stripe set 2 (920b) illustrates how extents (e.g., extents 925a and 925b) may be striped into a volume, in some embodiments.

More specifically, in this example, protection group 1 (930a) includes extents a-c (935a-935c), which include data from ranges 1-3 (915a-915c), respectively, and these extents are mapped to segments 1-4 (945a-945d). Protection group 2 (930b) includes extent d (935d), which includes data striped from range 4 (915d), and this extent is mapped to segments 5-7 (945e-945g). Similarly, protection group 3 (930c) includes extent e (935e), which includes data striped from range 4 (915d), and is mapped to segments 8-9 (945h-945i); and protection group 4 (930d) includes extent f (935f), which includes data striped from range 4 (915d), and is mapped to segment 10 (945j). In this example, protection group 6 (930e) includes extent g (935g), which includes data striped from range 5 (915e), and is mapped to segments 11-12 (945k-945l); and protection group 7 (930f) includes extent h (935h), which also includes data striped from range 5 (915e), and is mapped to segments 13-14 (945m-945n).

Please note that the striping, erasure coding, and other storage schemes for the database volume apply to the user data space of the database volume, not the log records pertaining to the volume. Log records are segmented across protection groups according to the partition of the volume maintained at the protection group. For example, log records indicating updates to the user data striped from range 5 maintained in PG 6, pertain to the user data in PG 6.

Figure 10:
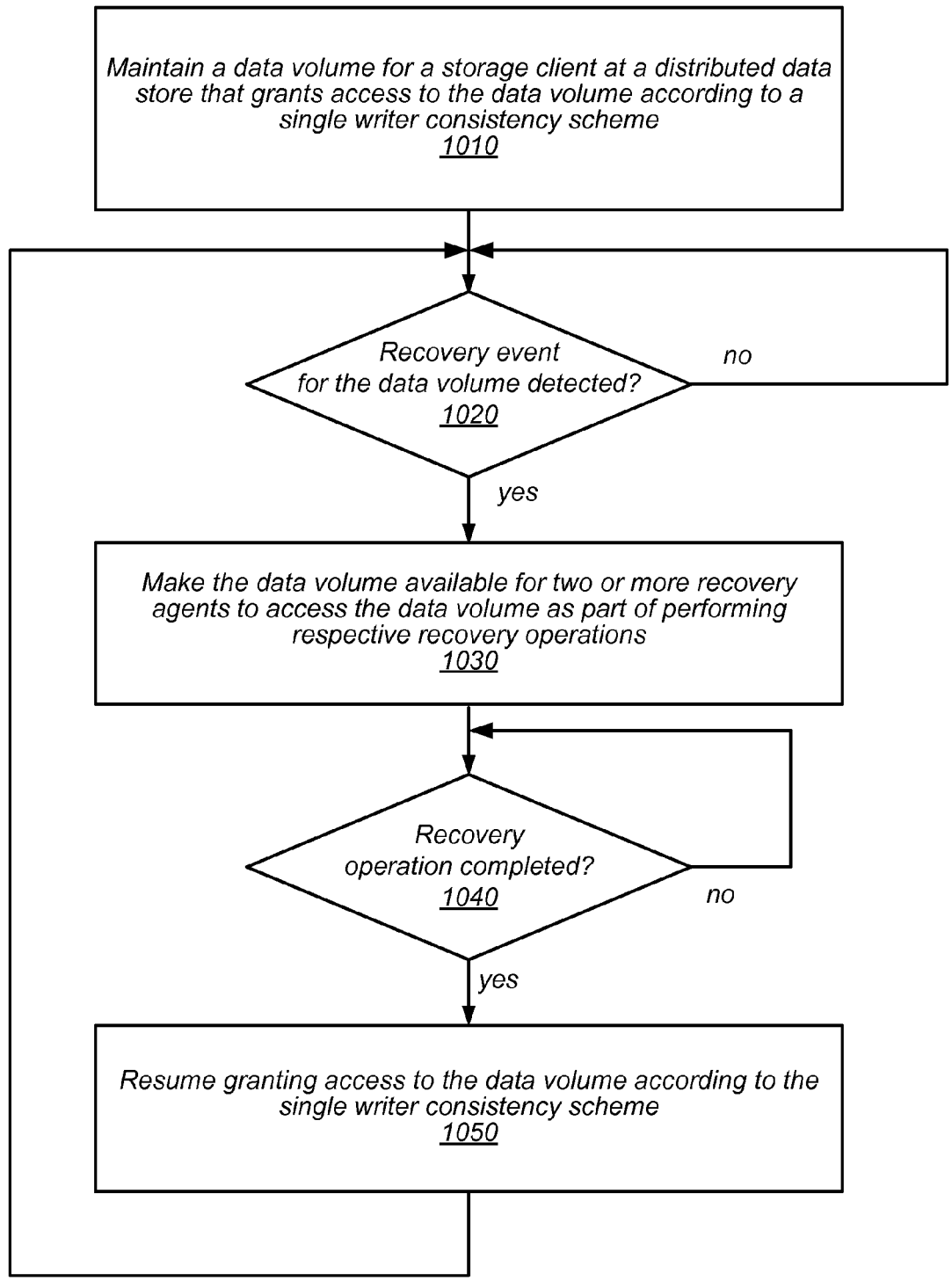
FIG. 10 is a high-level flowchart illustrating a technique for implementing volume recovery access in a distributed data store for multiple recovery agents, according to some embodiments.

The distributed storage service and database service discussed in FIGS. 2 through 9 provide examples of a distributed data store storing a data volume for a storage client (e.g., the database) and providing volume recovery access to multiple recovery agents. However, various other types of distributed storage systems may be implement, which may not be log-structured, along with other types of storage clients, which may not be databases. FIG. 10 is a high-level flowchart illustrating a technique for implementing volume recovery access in a distributed data store for multiple recovery agents, according to some embodiments. Various different distributed data stores, volume recovery services, storage clients may implement the techniques described below.

As indicated at 1010, a data volume may be maintained for a storage client a data distributed data store that grants access to the data volume according to a single writer consistency scheme. For example, the single writer consistency scheme may require storage clients to obtain a particular lock or other token that is exclusively possessed prior to writing to the data volume. As discussed above, in various embodiments, a volume state scheme may be implemented that allows the possessor of the current volume epoch identifier to perform write requests if the data volume is opened from a clean volume state and/or a dirty volume state. Current writers may be evicted or prevented from write access if the current volume epoch identifier changes (e.g., due to a new writer opening the data volume or any other change to the volume state). Data for the data volume may distributed among various storage nodes, servers, or storage locations in many different ways, such as the protection group schemes described above with regard to FIG. 9.

As indicated at 1020, a recovery event for the data volume may be detected. A recovery event may be any event that identifies, triggers, or causes a recovery operation to be performed for the data volume. In some embodiments, a request to release the data volume may be received (e.g., from a storage client or other client, or a system administrator for the distributed data store). In some embodiments, a failure of the storage client or other writing client may be detected. In some embodiments, a request or indication from the storage client may be received that indicates that the storage client is finished with the data volume, or will not resume after a failure. In response to detecting the recovery event, the data volume may be made available for two or more recovery agents to access the data volume as part of performing respective recovery operations, as indicated at 1030. Whereas prior to detecting the recovery event, only a single writer could write to the data volume, multiple recovery agents may be allowed (although only one recovery agent may actually perform a recovery operation) to access the data volume and perform writes as part of their respective recovery operations. For example, the locking mechanism or other mutually exclusive enforcement mechanism may be disengaged. In at least some embodiments, the data volume state may be updated to be set to a recovery volume state. Unlike the clean and dirty volume states (as described above with regard to FIG. 7), the recovery state may allow multiple writers to access the data volume as long as they have obtained the current volume epoch indicator corresponding to the recovery volume state. FIGS. 13 and 14 described below provide examples of recovery agents, which may be a storage client or recovery service agent, performing recovery operations to recover a data volume in a recovery volume state including volume epoch identifiers.

Recovery operations may be performed in many different ways. Generally, recovery operations may identify a consistent view of a data volume that may be considered authoritative for future read and write access and making the consistent view available. Recovery operations may not necessarily produce the same view of the data volume (as storage failures or other information may change while different recovery agents are performing a recovery operation). For log-structured distributed data stores, performing a recovery operation may include determining a recovery point in the log of a data volume that maintains consistent view of the data volume. For example, candidate log records for recovery may be requested from each of multiple protection groups storing the log for the data volume. As noted above, the log for the data volume may be segmented among protection groups according to a partition of the user data in various embodiments implementing a log-structured distributed data store. Each protection group may maintain a segment of log records, a log specific to the protection group, from which volume-wide recovery may be performed. Candidate log records may be log records that indicate possible recovery points for the log for the data volume. Once received, the candidate log records may be evaluated to identify a recovery point in the log for the data volume according to a log sequence number space. In some embodiments, log sequence numbers assigned from the log sequence number space for the data volume may be sparse. Thus, metadata may be included with candidate log records that indicates previous log sequence numbers in the log sequence number space in the data volume, in some embodiments.

Additionally, recovery operations may provide information so that the consistent view of the data is made available or visible to future read clients or write clients. This information may be written to various locations or storage nodes maintaining the data volume, in various embodiments, as well as a data store maintaining volume metadata (e.g., volume manager 412 discussed above in FIG. 4). Continuing with the log-structured data store example, in at least some embodiments, the recovery point may indicate a truncation point or range in the log, excluding log records with log sequence numbers within the truncated range from the view of the data volume. This truncation point (along with the range of excluded log records) may be sent to and persisted at each of the protection groups so that when, as discussed in the example above of applying log records at the storage nodes, log records are applied at the protection groups, the truncated log records may not be applied.

The first recovery operation to be completed may be detected, as indicated by the positive exit from 1040. In various embodiments, completion may be detected by determining the first recovery agent to send a request to modify the volume state, either to clean or dirty. In response to detecting the first complete recovery operation, granting access to the data volume according to the single writer consistency scheme may be resumed, as indicated at 1050. For example, a writer must obtain the current volume epoch indicator, in some embodiments, in order to write to the data volume.

Figure 11:
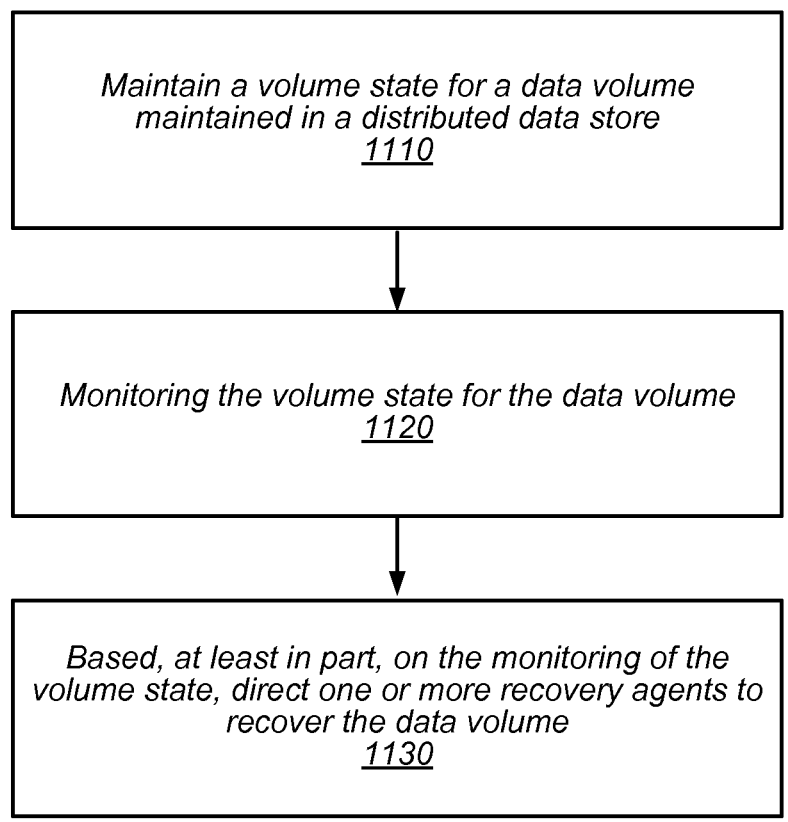
FIG. 11 is a high-level flowchart illustrating a technique for directing recovery agents to perform a volume recovery operation for a data volume, according to some embodiments.

As noted above, both storage clients and other recovery agents may perform volume recovery operations to recovery a data volume. For a data volume recovery service, such as recovery service 414 described above in FIG. 4, or any other system or component that facilitates data recovery without the need of a storage client opening a data volume, various dynamic techniques may be implemented to automatically or intelligently determine when to perform a volume recovery operation. FIG. 11 is a high-level flowchart illustrating a technique for directing recovery agents to perform a volume recovery operation for a data volume, according to some embodiments.

As indicated at 1110 a volume state for a data volume may be maintained. As indicated at 1120, the volume state for the data volume may be monitored, in various embodiments. For example, the amount of time a volume is set to a recovery state may be monitored or evaluated. As indicated at 1130, one or more recovery agents may be directed to recover the data volume based, at least in part, on the monitoring of the volume state for the data volume. If a time period or timeout is exceeded, for example, based on the monitoring of the time spent in a recovery state, then recovery agents may be directed to recover the data volume. In some embodiments, it may be that as soon as a data volume transitions to a recovery volume state, one or more recovery agents may be directed to begin performing recovery operations. Information, such as a volume epoch indicator, may be provided to recovery agents in order to allow them to perform recovery operations.

Figure 12:
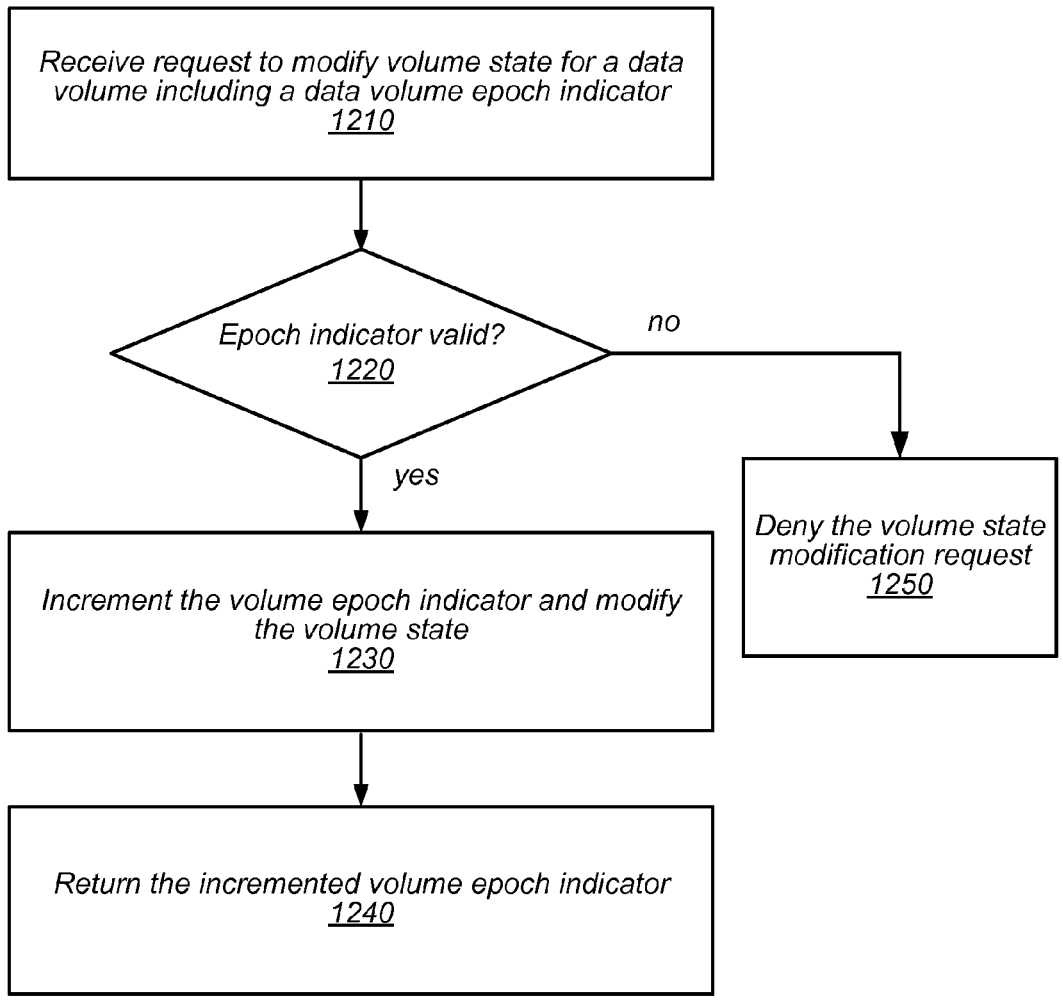
FIG. 12 is a high-level flowchart illustrating a technique for handling volume state change requests for a data volume, according to some embodiments.

Providing multiple recovery agents with access to a data volume for recovery may involve managing transitions between states for a data volume. FIG. 7, discussed above, provides various examples of the different types of volume states and conditions to transfer between each state. In some embodiments, requests to change volume state may need to be processed in such a way so as not to allow recovery agents, storage clients, or any other actors that modify volume state to modify the volume state based on a stale view of the data volume. FIG. 12 is a high-level flowchart illustrating a technique for handling volume state change requests for a data volume, according to some embodiments.

As indicated at 1210, a request to modify volume state for a data volume may be received that includes a data volume epoch indicator. In various embodiments the data volume epoch indicator may be a monotonically increasing indicator that is increased each time there is a change in the data volume state. Therefore the included data volume epoch indicator in the request may be evaluated to determine if it is valid as the current volume epoch indicator, as indicated at 1220. For instance, if the current volume epoch indicator for the data volume as maintained at a volume manager or other authoritative source for the current volume epoch indicator, then it may be determined whether the included data volume epoch indicator matches the current data volume epoch indicator. If not, as indicated by the negative exit, the request to modify the data volume state may be denied, as indicated at 1250. In some embodiments, an error message or other denial may include the current data volume epoch indicator (and/or other state information for the data volume) in a response. If the data volume epoch indicator in the request is valid, as indicated by the positive exit from 1220, then the volume epoch indicator may be incremented and the data volume state modified as in the request. In some embodiments, the incrementing of the volume epoch indicator and modification of the volume state may be performed atomically so that either both values are updated or both values are not updated. In this way, a failure may not cause a discrepancy between the volume epoch indicator and the volume state. Once updated, the incremented volume epoch indicator may be returned in response to the request, as indicated at 1240.

Figure 13:
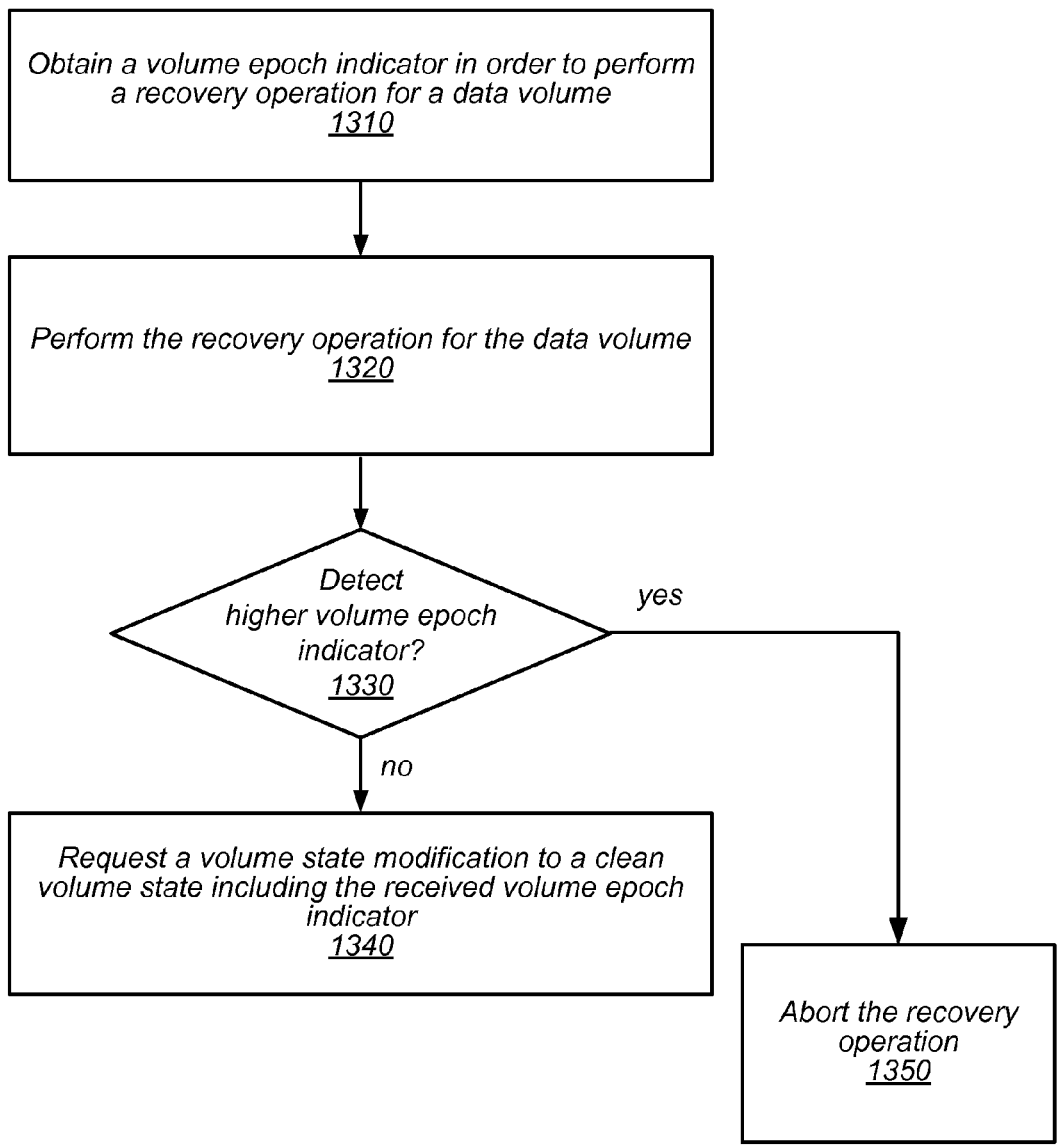
FIG. 13 is a high-level flowchart illustrating a technique for performing volume recovery at a recovery service agent, according to some embodiments.
Figure 14:
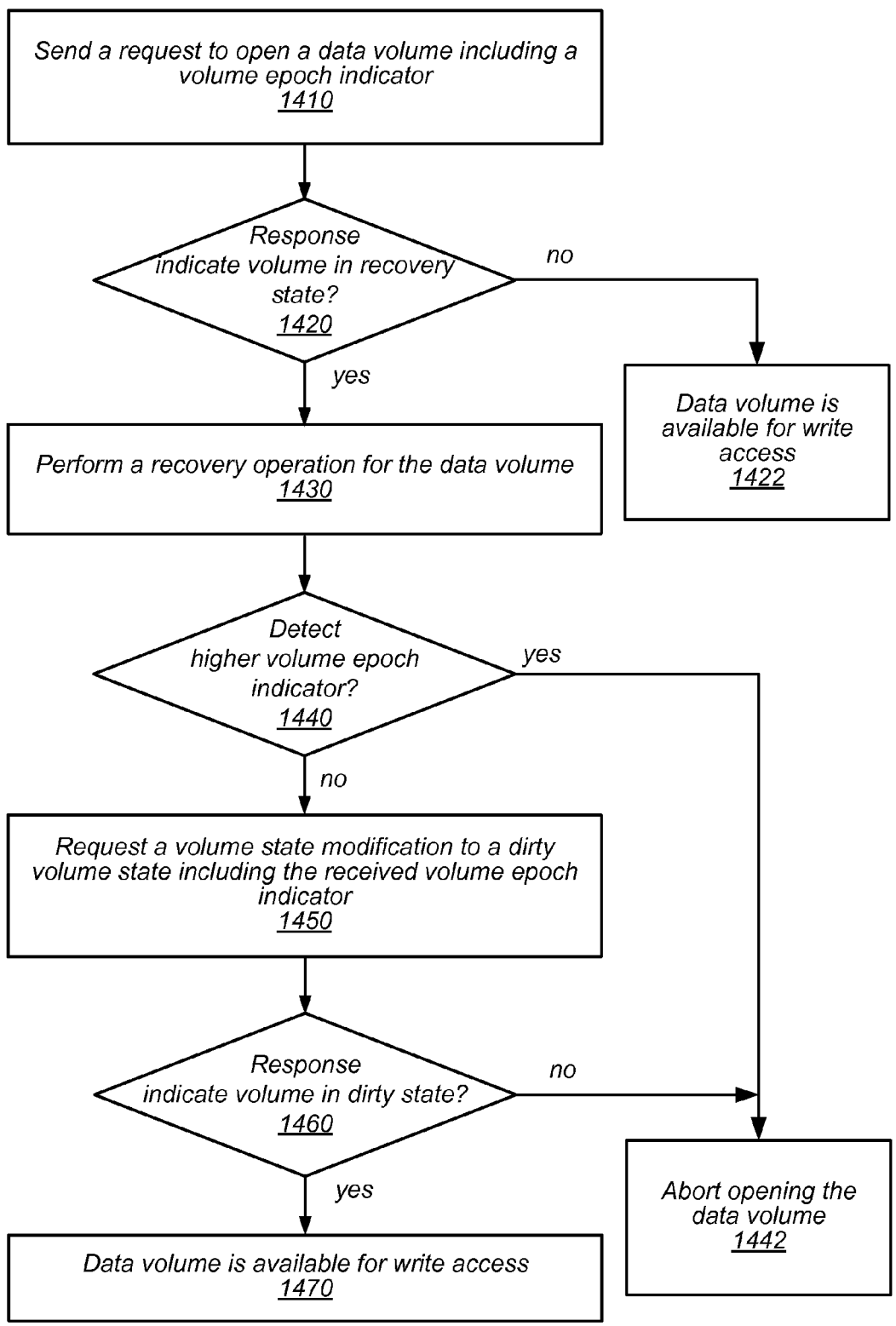
FIG. 14 is a high-level flowchart illustrating a technique for performing volume recovery at a recovery agent implemented as part of a storage client, according to some embodiments.

FIG. 13 is a high-level flowchart illustrating a technique for performing volume recovery at a recovery service agent, according to some embodiments. As indicated at 1310, a recovery service agent (or other component or device that is only performing a recovery operation and not opening the data volume for writing) may obtain a volume epoch indicator in order to perform a recovery operation for a data volume. Recovery agent may send a request to obtain the volume epoch indicator. The request may include a current volume epoch indicator, which may be validated. In some embodiments, the volume epoch indicator may already supplied to the recovery agent (e.g., by a volume recovery service) so requesting the volume epoch indicator may be unnecessary. As indicated at 1320, the recovery operation may be performed for the data volume. The recovery operation may evaluate the data volume and determine a consistent view of the data volume to be authoritative for the data volume. A recovery operation may include various reads and writes to the data volume to indicate the consistent view of the data volume.

While performing the recovery operation for the data volume, the recovery service agent may detect that a higher volume epoch indicator applies to the state of the data volume. For example, when write or read requests are sent to storage nodes, the recovery service client may include the volume epoch indicator obtained at 1310. If the volume epoch indicator is no longer the highest, the storage nodes that receive the access requests may send an error response and/or indication of the new higher volume epoch indicator. Based on responses from the storage nodes, it may be determined whether higher volume epoch indicator exists for the data volume, as indicated at 1330. If a higher volume epoch indicator is detected, as indicated by the positive exit from 1330, then the recovery operation may be aborted, as indicated at 1350. As noted above in FIG. 12, a higher volume epoch indicator may indicate that the state of the data volume has changed (e.g., another recovery operation completed first). However, if no higher volume epoch indicator is detected, as indicated by the negative exit from 1330, then the recovery service agent may continue with performing the recovery operation. Upon completion of the recovery operation, the recovery service agent may send a request to modify the volume state to a clean volume state, as indicated at 1340. The request may include the received volume epoch indicator. Although not illustrated, if an error response or other indication that the volume epoch indicator is higher is received, then the recovery service agent may abort the recovery operation, as described at 1360.

FIG. 14 is a high-level flowchart illustrating a technique for performing volume recovery at a recovery agent implemented as part of a storage client, according to some embodiments. As indicated at 1410, a storage client may send a request to open a data volume to a distributed data store maintaining the data volume. In various embodiments, the request may be sent to a volume manager or other component that may control or enforce the single writer consistency scheme. The request may include, in some embodiments, a volume epoch indicator, which as discussed above may provide an indication of the storage client's view of the data volume. The storage client may receive a response which may indicate the state of the data volume (e.g., recovery or dirty). Although not illustrated, in some embodiments, the storage client may receive an indication that the volume epoch indicator was invalid. For responses that include a volume state it may be determined whether the data volume is in recovery state, as indicated at 1420. If not, as indicated by the negative exit from 1420, then the data volume may be available for write access, as indicated at 1422. A new volume epoch identifier may be included which may be subsequently used to perform write requests, in some embodiments. In some embodiments, a volume manager may be unaware that an active writer is still writing to a data volume, therefore it may be that in some embodiments, then the volume manager may transition the data volume to a recovery state.

If, however, the data volume is in recovery state, as indicated by the positive exit from 1420, then the storage client may perform a recovery operation for the data volume, as indicated at 1430. Similarly to the recovery operation discussed above with regard to FIGS. 6 and 13, the recovery operation may evaluate and determine a consistent view of the data volume, as well as perform at least one write to the data volume to indicate the consistent view of the data volume. While performing the recovery operation for the data volume, the storage client may detect that a higher volume epoch indicator applies to the state of the data volume. For example, when write or read requests are sent to storage nodes, the storage client may include the volume epoch indicator received at 1420. If the volume epoch indicator is no longer the highest, the storage nodes that receive the access requests may send an error response and/or indication of the new higher volume epoch indicator. Based on responses from the storage nodes, it may be determined whether higher volume epoch indicator exists for the data volume, as indicated at 1440. If a higher volume epoch indicator is detected, as indicated by the positive exit from 1440, then the opening of the data volume (and the recovery operation) may be aborted, as indicated at 1442. As noted above in FIG. 12, a higher volume epoch indicator may indicate that the state of the data volume has changed (e.g., another recovery operation completed first). However, if no higher volume epoch indicator is detected, as indicated by the negative exit from 1440, then the storage client may continue with performing the recovery operation.

Upon completion of the recovery operation, the storage client may send a request to modify the volume state to a dirty volume state, as indicated at 1450. The request may include the received volume epoch indicator. In some embodiments, a response may be received either providing another volume epoch indicator and an indication that the volume is now in dirty volume state, as indicated by the positive exit from 1460.

The data volume may then be considered available to the storage client for write access, as indicated at 1470. Thus the storage client may have mutually exclusive write access to the data volume. If however, a response is received that does not indicate the data volume state is now the dirty data volume state (e.g., an error indication or indication of a different volume state such as the recovery volume state), then the opening of the data volume by the storage client may be aborted, as indicated at 1442.

The methods described herein may in various embodiments be implemented by any combination of hardware and software. For example, in one embodiment, the methods may be implemented by a computer system (e.g., a computer system as in FIG. 15) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 15:
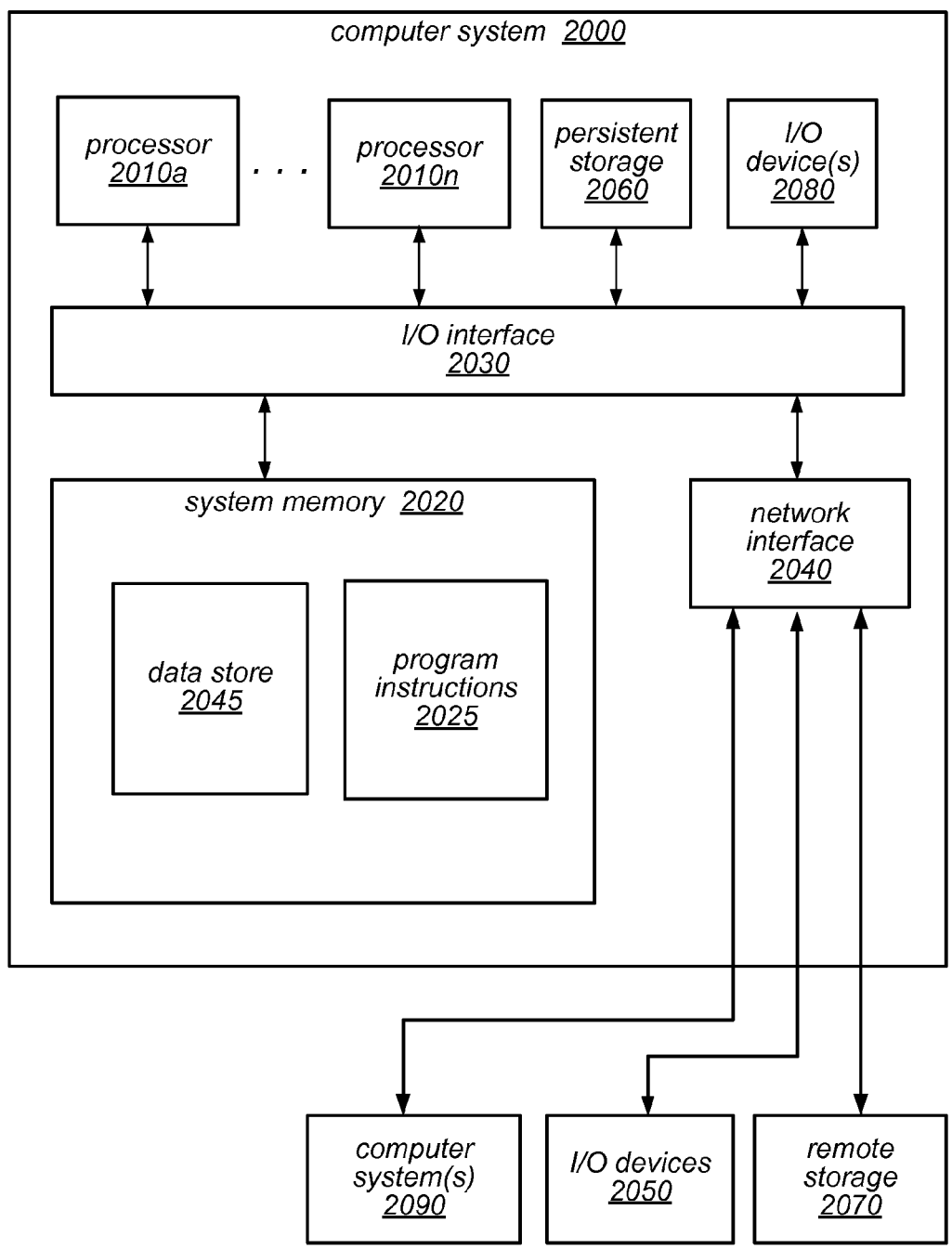
FIG. 15 is an example computer system, according to various embodiments.

FIG. 15 is a block diagram illustrating a computer system configured to implement the distributed data store providing volume recovery access to multiple recovery agents, according to various embodiments, as well as various other systems, components, services or devices described above. For example, computer system 2000 may be configured to implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 15 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of compute nodes that together implement a distributed data store;
at least some of the plurality of compute nodes, configured to maintain a data volume for a storage client;
one or more of the plurality of compute nodes together implement a volume manager for the distributed data store, the volume manager configured to:
maintain a volume state for the data volume, wherein the volume state is implemented as part of a single writer consistency scheme for the data volume;
in response to detection of a recovery event, modify the volume state for the data volume to a recovery state to allow two or more recovery agents to access the data volume for performance of respective recovery operations for the data volume, wherein each of the respective recovery operations comprises at least one write to the data volume; and
in response to a determination that a first respective recovery operation for one of the two or more recovery agents is complete, modify the volume state to resume granting write access to the data volume according to the single writer consistency scheme.

2. The system of claim 1, wherein the volume manager comprises a volume recovery service module, configured to:
based, at least in part, on an evaluation of the volume state for the data volume, direct one or more recovery service agents to recover the data volume, wherein the first respective recovery operation for the one recovery agent that is complete is a respective recovery operation performed by one of the one or more recovery service agents.

3. The system of claim 1, wherein the volume manager is further configured to:
maintain a volume epoch indicator for the data volume; and
in response to a modification of the volume state, monotonically increase the volume epoch indicator.

4. The system of claim 1, wherein the distributed data store is a multi-tenant, network-based data storage service storing a plurality of different data volumes including the data volume for a plurality of different storage clients, and wherein the storage client is one of the plurality of different storage clients.

5. A method, comprising:
performing, by one or more computing devices:
maintaining a data volume for a storage client among a plurality of different storage nodes that together implement a distributed data store, wherein the distributed data store grants write access to the data volume according to a single writer consistency scheme;
in response to detecting a recovery event for the data volume, making the data volume available to allow two or more recovery agents to access the data volume for performing respective recovery operations for the data volume, wherein each of the respective recovery operations comprises at least one write to the data volume; and
in response to determining that a first respective recovery operation for one of the two or more recovery agents is complete, resuming granting write access to the data volume according to the single writer consistency scheme.

6. The method of claim 5, further comprising:
maintaining a volume state for the data volume;
wherein said making the data volume available to allow two or more recovery agents to access the data volume comprises modifying the volume state to a recovery volume state;
monitoring the volume state for the data volume;
based, at least in part, on said monitoring, directing one or more recovery service agents to recover the data volume, wherein the first respective recovery operation for the one recovery agent that is complete is a respective recovery operation performed by one of the one or more recovery service agents.

7. The method of claim 6,
wherein said determining that the first respective recovery operation for the one of the two or more recovery agents is complete comprises:
receiving a request to modify the volume state from the one recovery service agent to a clean volume state, wherein the request includes a volume epoch identifier;
in response to receiving the request, determining that the volume epoch indicator is valid; and
wherein said resuming granting write access to the data volume according to the single writer consistency scheme comprises modifying the volume state to the clean volume state.

8. The method of claim 7, further comprising:
subsequent to the modifying the volume state to the clean volume state, receiving a request to open the data volume for write access; and
in response to receiving the request, modifying the volume state to a dirty volume state as part of providing write access to the data volume.

9. The method of claim 5, further comprising:
maintaining a volume state for the data volume;
wherein said making the data volume available to allow two or more recovery agents to access the data volume comprises modifying the volume state to a recovery volume state;
wherein the first respective recovery operation for the one recovery agent that is complete is a respective recovery operation performed by the storage client;
wherein said determining that the first respective recovery operation for the one of the two or more recovery agents is complete comprises:
receiving a request to modify the volume state from the one recovery service agent to a dirty volume state from the storage client, wherein the request includes a volume epoch identifier;
in response to receiving the request, determining that the volume epoch indicator is valid; and
wherein said resuming granting write access to the data volume according to the single writer consistency scheme comprises modifying the volume state to the dirty volume state.

10. The method of claim 5, comprising:
performing, by one or more other computing devices implementing another one of the two or more recovery agents:
in response to determining that the data volume is recovered, aborting the respective recovery operation performed by the other one recovery agent.

11. The method of claim 5, wherein the one recovery agent is a recovery service agent, and wherein the method further comprises:
in response to detecting a failure of a previously provisioned recovery service performing a recovery operation to recover the data volume, provisioning the recovery service agent to complete the recovery operation.

12. The method of claim 5, wherein said detecting the recovery event for the data volume comprises receiving a release request for the data volume to remove a current writer to the data volume.

13. The method of claim 5, wherein the distributed data store is a multi-tenant, network-based storage service, and wherein the storage client is a network-based database service.

14. A non-transitory, computer-readable storage medium, storing program instructions that when executed by one or more computing devices cause the one or more computing devices to implement:
maintaining a data volume for a storage client among a plurality of different storage nodes that together implement a distributed data store, wherein the distributed data store grants write access to the data volume according to a single writer consistency scheme;
in response to detecting a recovery event for the data volume, making the data volume available to allow two or more recovery agents to access the data volume for performing respective recovery operations for the data volume, wherein at least one of the two or more recovery agents is implemented as part of a recovery service for the distributed data store, wherein each of the respective recovery operations comprises at least one write to the data volume; and
in response to determining that a first respective recovery operation for one of the two or more recovery agents is complete, resuming granting write access to the data volume according to the single writer consistency scheme.

15. The non-transitory, computer-readable storage medium of claim 14, wherein the program instructions further cause the one or more computing devices to implement:
maintaining a volume state for the data volume;
wherein said making the data volume available to allow two or more recovery agents to access the data volume comprises modifying the volume state to a recovery volume state;
monitoring the volume state for the data volume;
based, at least in part, on said monitoring, directing one or more recovery service agents to recover the data volume, wherein the first respective recovery operation for the one recovery agent that is complete is a respective recovery operation performed by one of the one or more recovery service agents.

16. The non-transitory, computer-readable storage medium of claim 15,
wherein in said determining that the first respective recovery operation for the one of the two or more recovery agents is complete, the program instructions cause the one or more computing devices to implement:
receiving a request to modify the volume state from the one recovery service agent to a clean volume state, wherein the request includes a volume epoch identifier;
in response to receiving the request, determining that the volume epoch indicator is valid; and
wherein, in said resuming granting write access to the data volume according to the single writer consistency scheme, the program instructions cause the one or more computing devices to implement modifying the volume state to the clean volume state.

17. The non-transitory, computer-readable storage medium of claim 14,
wherein the program instructions further cause the one or more computing devices to implement maintaining a volume state for the data volume;
wherein, in said making the data volume available to allow two or more recovery agents to access the data volume, the program instructions further cause the one or more computing devices to implement modifying the volume state to a recovery volume state;
wherein the first respective recovery operation for the one recovery agent that is complete is a respective recovery operation performed by the storage client;
wherein, in said determining that the first respective recovery operation for the one of the two or more recovery agents is complete, the program instructions further cause the one or more computing devices to implement:
receiving a request to modify the volume state from the one recovery service agent to a dirty volume state from the storage client, wherein the request includes a volume epoch identifier;
in response to receiving the request, determining that the volume epoch indicator is valid; and
wherein, in said resuming granting write access to the data volume according to the single writer consistency scheme, the program instructions further cause the one or more computing devices to implement modifying the volume state to the dirty volume state.

18. The non-transitory, computer-readable storage medium of claim 14, wherein in said detecting the recovery event for the data volume, the program instructions further cause the one or more computing devices to implement determining that a write access time period for the data volume has expired.

19. The non-transitory, computer-readable storage medium of claim 14, wherein the distributed data store is a multi-tenant, network-based storage service, and wherein the storage client is a network-based database service.

20. The non-transitory, computer-readable storage medium of claim 19, wherein the distributed data store is a log-structured data store, wherein a log describing updates to the data volume is maintained at the log-structured data store, and wherein each of the respective recovery operations comprises identifying a truncation point in the log for the data volume.

* * * * *